US011731754B2

(12) United States Patent
Good et al.

(10) Patent No.: US 11,731,754 B2
(45) Date of Patent: Aug. 22, 2023

(54) ACTUATION AND SUPPORT SYSTEM FOR AERODYNAMIC SURFACES

(71) Applicant: THE BOEING COMPANY, Chicago, IL (US)

(72) Inventors: Mark S. Good, Seattle, WA (US);
Stephen P. Walker, Arlington, WA (US)

(73) Assignee: The Boeing Company, Arlington, VA (US)

( * ) Notice: Subject to any disclaimer, the term of this patent is extended or adjusted under 35 U.S.C. 154(b) by 24 days.

(21) Appl. No.: 17/385,518

(22) Filed: Jul. 26, 2021

(65) Prior Publication Data
US 2023/0028198 A1 Jan. 26, 2023

(51) Int. Cl.
*B64C 9/22* (2006.01)
*B64C 9/16* (2006.01)

(52) U.S. Cl.
CPC . *B64C 9/22* (2013.01); *B64C 9/16* (2013.01)

(58) Field of Classification Search
CPC ............... B64C 9/22; B64C 9/24; B64C 9/26
See application file for complete search history.

(56) References Cited

U.S. PATENT DOCUMENTS

| 3,743,219 | A | * | 7/1973 | Gorges | ...................... B64C 9/24 244/210 |
| 2007/0102587 | A1 | * | 5/2007 | Jones | ........................ B64C 9/22 244/214 |
| 2012/0193183 | A1 | * | 8/2012 | Gunter | .................... B64C 9/323 192/30 R |

* cited by examiner

*Primary Examiner* — Timothy D Collins
*Assistant Examiner* — Eric Acosta
(74) *Attorney, Agent, or Firm* — Patterson + Sheridan, LLP (57) ABSTRACT

Certain aspects of the present disclosure provide techniques for an aerodynamic surface actuation system, including: a plurality of outer tracks, wherein each outer track of the plurality of outer tracks include: an inner roller channel; and an outer roller channel positioned above the inner roller channel; an aerodynamic surface connected to a carrier, wherein the carrier includes: a plurality of rollers configured to move within inner roller channels of the plurality of outer tracks; and a carrier rack; a plurality of fixed rollers mounted to a plurality of longitudinal structural elements in an aerodynamic structure, wherein the plurality of fixed rollers are disposed within outer roller channels of the plurality of outer tracks; and a plurality of fixed racks, wherein each fixed rack of the plurality of fixed racks is mounted to a longitudinal structural element of the plurality of longitudinal structural elements.

20 Claims, 8 Drawing Sheets

ACTUATION AND SUPPORT SYSTEM FOR AERODYNAMIC SURFACES

FIELD

This disclosure relates generally to an actuation system for controlling the positioning of aerodynamic surfaces.

BACKGROUND

Conventional actuation systems for extending and retracting aerodynamic surfaces use single body tracks to extend and retract the surfaces. For example, leading edge slats of an aircraft are supported by the single body tracks when extended from a leading edge of a wing. Each single body track is disposed in the leading edge and connects the slat to the wing. However, the length required for the single body tracks to extend the slat is often greater than the space available inside the leading edge. Conventional systems use local penetrations in the wing spar to overcome this spatial issue. The penetrations allow the tracks to pass through the wing spar and into the main wing box cavity, which is on an aft side (or trailing edge side) of the wing spar. This is undesirable for several reasons.

First, the main wing box cavity may store fuel for the aircraft. Thus, to prevent the fuel from flowing through the penetrations and into the leading edge, the penetrations may be sealed with slat cans. The slat cans are configured to seal off the leading edge from the main wing box and surround the track when the track is retracted inside the main wing box. However, the seal around the slat cans may wear out over time, allowing fuel into the leading edge area. Second, the penetrations reduce the strength of the wing spar and require structural reinforcement of the spar surrounding the slat cans, which increases the weight of the aircraft and hardware necessary for building and maintaining the aircraft. Third, the slat can may be hard to manufacture and install because of dimensions of the slat can and limited space in the installation location. For example, the dimensions of the slat cans may interfere with surrounding features inside the main wing box. Thus, the slat can may contact the surrounding features causing damage to the features or the slat cans. In addition to the disruption of the spar structure, slat cans also are problematic for solving electrical isolation issues (EME) in carbon fiber wings.

Accordingly, there is a need for an aerodynamic surface actuation system that can fit entirely inside constrained spaces, such as inside a leading or trailing edge of an airplane wing, while maintaining the ability to fully extend and fully retract the aerodynamic surface.

SUMMARY

Certain embodiments provide an aerodynamic surface actuation system. The system comprises a plurality of outer tracks, wherein each outer track of the plurality of outer tracks comprises an inner roller channel; and an outer roller channel positioned above the inner roller channel; an aerodynamic surface connected to a carrier, wherein the carrier comprises a plurality of rollers configured to move within inner roller channels of the plurality of outer tracks; and a carrier rack; a plurality of fixed rollers mounted to a plurality of longitudinal structural elements in an aerodynamic structure, wherein the plurality of fixed rollers are disposed within outer roller channels of the plurality of outer tracks; and a plurality of fixed racks, wherein each fixed rack of the plurality of fixed racks is mounted to a longitudinal structural element of the plurality of longitudinal structural elements.

Other aspects provide a method of actuating an aerodynamic surface. The method comprises moving a carrier connected to an aerodynamic surface along a plurality of outer tracks, wherein a plurality of rollers connected to the carrier interface with inner roller channels of the plurality of outer tracks. The method further comprises moving the plurality of outer tracks along a plurality of fixed rollers, wherein outer roller channels of the plurality of outer tracks interface with the plurality of fixed rollers.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide an aerodynamic surface actuation system that can fit entirely inside constrained spaces while maintaining the ability to fully extend and fully retract the aerodynamic surface to a plurality of operating positions.

According to one aspect, the surface actuation system connects to a leading edge slat of an airplane and is disposed inside a leading edge of a wing. The surface actuation system extends the leading edge slat forward and away from the wing to increase the camber of the wing and result in higher angles of attack of the wing. The higher angles of attack provide an increased lift for the aircraft at lower speeds, such as during take-off and landing. The surface actuation system also retracts the leading edge slat towards the wing to a fully retracted position when the higher angles of attack are not desired. Other aspects may instead control another aerodynamic surface, such as a trailing edge flap, or the like.

A shortcoming of conventional actuation systems is that they may not fit within the space available when fully retracted and thus require modification of surrounding structures. As an example of this, consider a conventional actuation system that uses a plurality of single body tracks to extend and retract the slats of a wing, such as depicted and described below with respect to FIG. 1B. Here, the single body tracks are disposed inside the leading edge of the wing and are typically have a length long enough to extend the slat a required distance away from the wing to maintain a desired camber of the wing. However, the space available inside the leading edge, between the slat and a wing spar, is limited and often shorter than the length of the single body track needed to extend the slat. Thus, the conventional, single body tracks must extend through the wing spar when the slats are in a fully retracted position, requiring penetrations in the wing spar for the single body tracks to extend through. Further, there may be a fuel tank on a side of the wing spar opposite the leading edge. The penetrations must be sealed and reduce the strength of the wing spar. Thus, additional seals and structural reinforcement are needed, increasing a complexity and a weight of the aircraft.

The surface actuation system described herein addresses these issues by actuating outer tracks with a rack and pinion track system. The configuration of the outer tracks and the racks and pinions allows the surface actuation system to fit within the space available inside the aircraft. For example, the surface actuation system fits inside the leading edge when the slat is in a fully retracted position without penetrating the wing spar. The tracks also extend the slat the required distance away from the wing to maintain the desired camber of the wing.

While leading edges and slats are discussed, they are only examples of an aerodynamic surface that can be used with the surface actuation system, and other aerodynamic surfaces are possible. For example, the aerodynamic surface activation systems described herein may similarly be configured to extend a flap from a trailing edge of the aircraft.

Example Vehicle with Extendable Surfaces

Figure 1A:
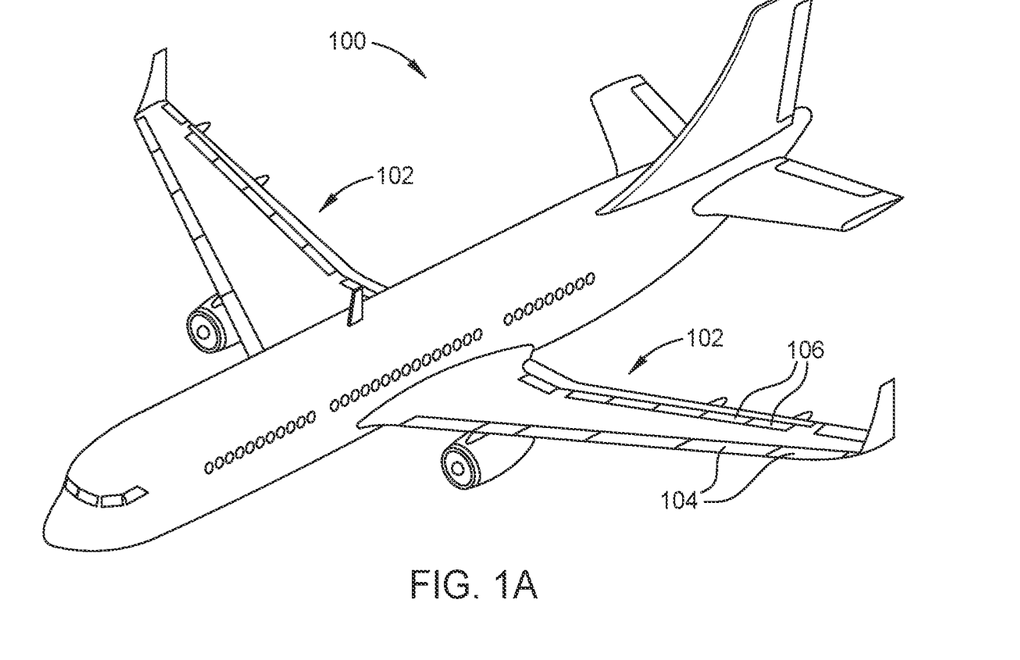
FIG. 1A depicts an aircraft with extendable aerodynamic surfaces, according to an example of the present disclosure.

FIG. 1A depicts an aircraft 100 with extendable aerodynamic surfaces, according to an example of the present disclosure.

As shown, the aircraft 100 has two wings 102, each having leading edge slats 104 and trailing edge flaps 106. Slats 104 and flaps 106 may be extended from the wing 102 to increase a lift generated by the wing 102 when the aircraft 100 flies at lower airspeeds, such as during take-off and landing. An actuation system (not shown) is used to extend and retract the slats 104 and flaps 106 between fully extended and fully retracted positions, as well as other intermediate positions based on aircraft type and design. However, there is limited space available inside certain portions of the wing 102 for the actuation system as discussed in relation to FIG. 1B. Thus, an aerodynamic surface actuation system, as discussed in relation to FIGS. 2-4B, beneficially enables full articulation within the limited space without the disadvantages of conventional methods of penetrating wing spars.

Example Conventional System for Positioning Aerodynamic Surfaces

Figure 1B:
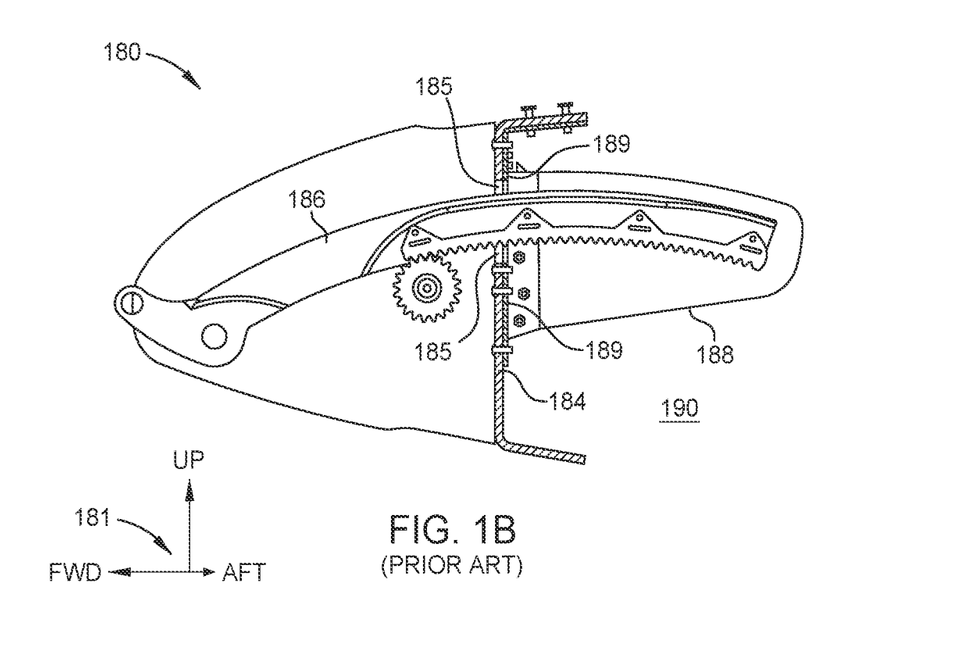
FIG. 1B depicts a side plan view of a conventional system for positioning aerodynamic surfaces.

FIG. 1B depicts a side plan view of a conventional system 180 for positioning aerodynamic surfaces. In particular, FIG. 1B shows the conventional system 180 in a fully retracted position.

The conventional system 180 is positioned in a leading edge of a wing 102 of the aircraft 100. A single body track 186 attaches to a slat (not shown) at a forward end of the single body track 186 in relation to a coordinate system 181. The single body track 186 has a length long enough to extend the slat a required distance away from the wing and is configured to extend the slat in the forward direction. The single body track 186 is also configured to retract the slat in the aft direction. As shown, when in the fully retracted position the single body track 186 extends through a penetration 185 in the spar 184 and into a main wing box cavity 190. The penetration 185 is required because the length of the single body track 186 is too long to fit in the leading edge of the wing 102.

Although not shown, the main wing box cavity 190 may contain fuel and thus the penetration 185 is sealed using a slat can 188. The slat can 188 sealably connects to the spar 184 and extends in an aft direction into the main wing box cavity 190. The slat can 188 further covers an aft portion of the single body track 186 and allows the single body track 186 to extend into the main wing box cavity 190 without contacting the fuel. The spar 184 includes a structural reinforcement 189 in an area surrounding the slat can 188, which reinforces the spar 184 to compensate for the strength lost from the penetration 185. The conventional system 180 further includes a seal (not shown) disposed between the spar 184 and the slat can 188 configured to prevent fuel from intruding into the slat can 188 or the leading edge.

As is clear from the example in FIG. 1B, having the single body track 186 extend into the wing box cavity 190 necessitates many additional structures that add complexity to manufacture and maintenance, as well as additional weight for the reinforcement structures. Further yet, slat can 188 may reduce the effective volume for fuel storage in wing box 190. The systems described herein resolve all of these challenges.

Example System for Positioning an Aerodynamic Surface

Figure 2:
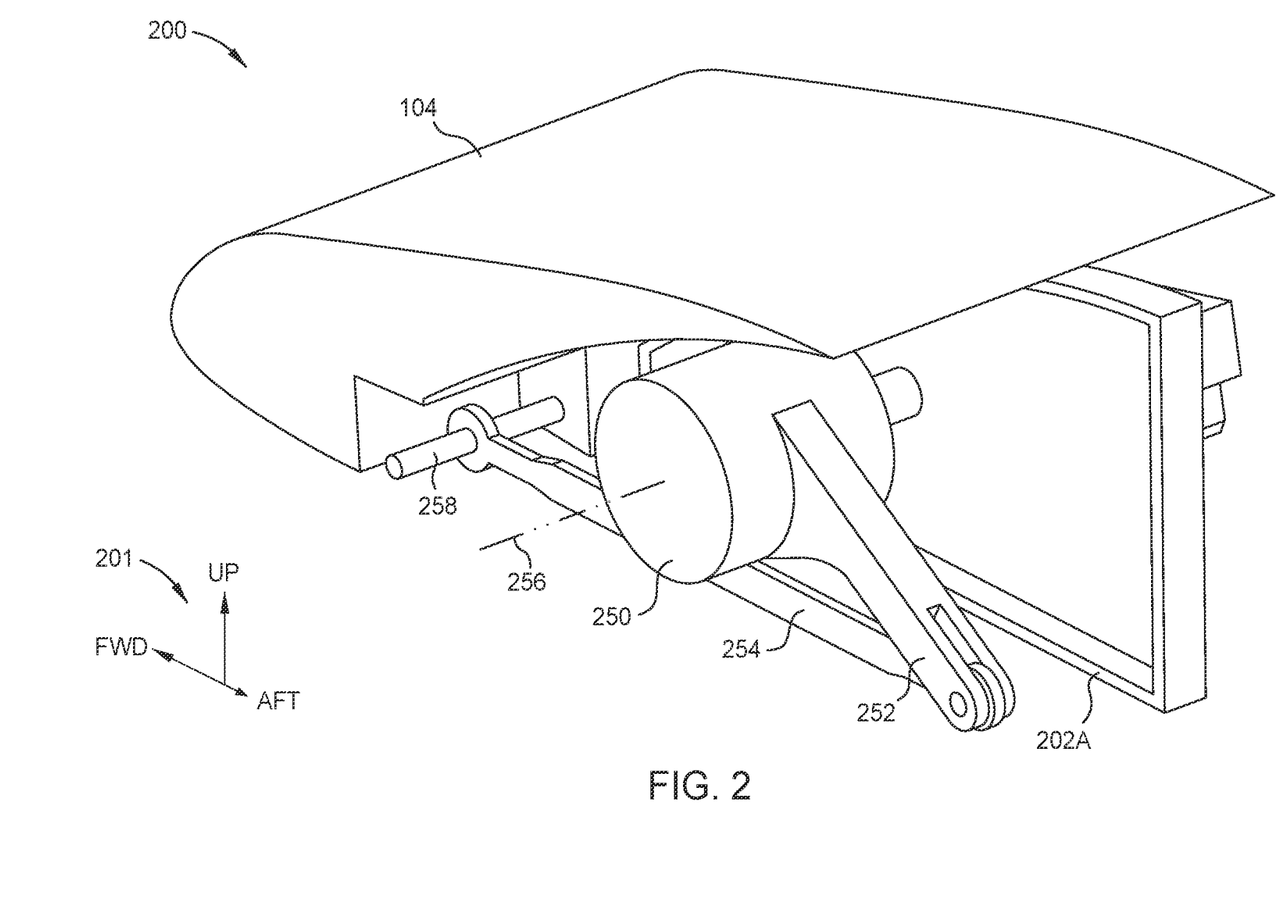
FIG. 2 depicts an isometric view of certain aspects of an aerodynamic surface actuation system according to an example of the present disclosure.

FIG. 2 depicts an isometric view of certain aspects of an aerodynamic surface actuation system 200, according to an example embodiment of the present disclosure. In particular, FIG. 2 shows the aerodynamic surface actuation system 200 (referred to as the system 200) in a fully retracted position.

The system 200 includes an actuator 250 connected to an aerodynamic surface. In the depicted embodiment, the actuator 250 is a rotary actuator and the aerodynamic surface is a slat 104. The actuator 250 is configured to extend and retract (generally referred to as actuating or positioning) the slat 104. The system 200 further includes a control element 254 (e.g., a rod) connected between the actuator 250 and the slat 104. As shown, the control element 254 connects to an actuator arm 252 that extends away from the actuator 250. The control element 254 further connects to a bracket 258 of the slat 104, where the bracket 258 may be a shaft.

Figures 3A, 3B:
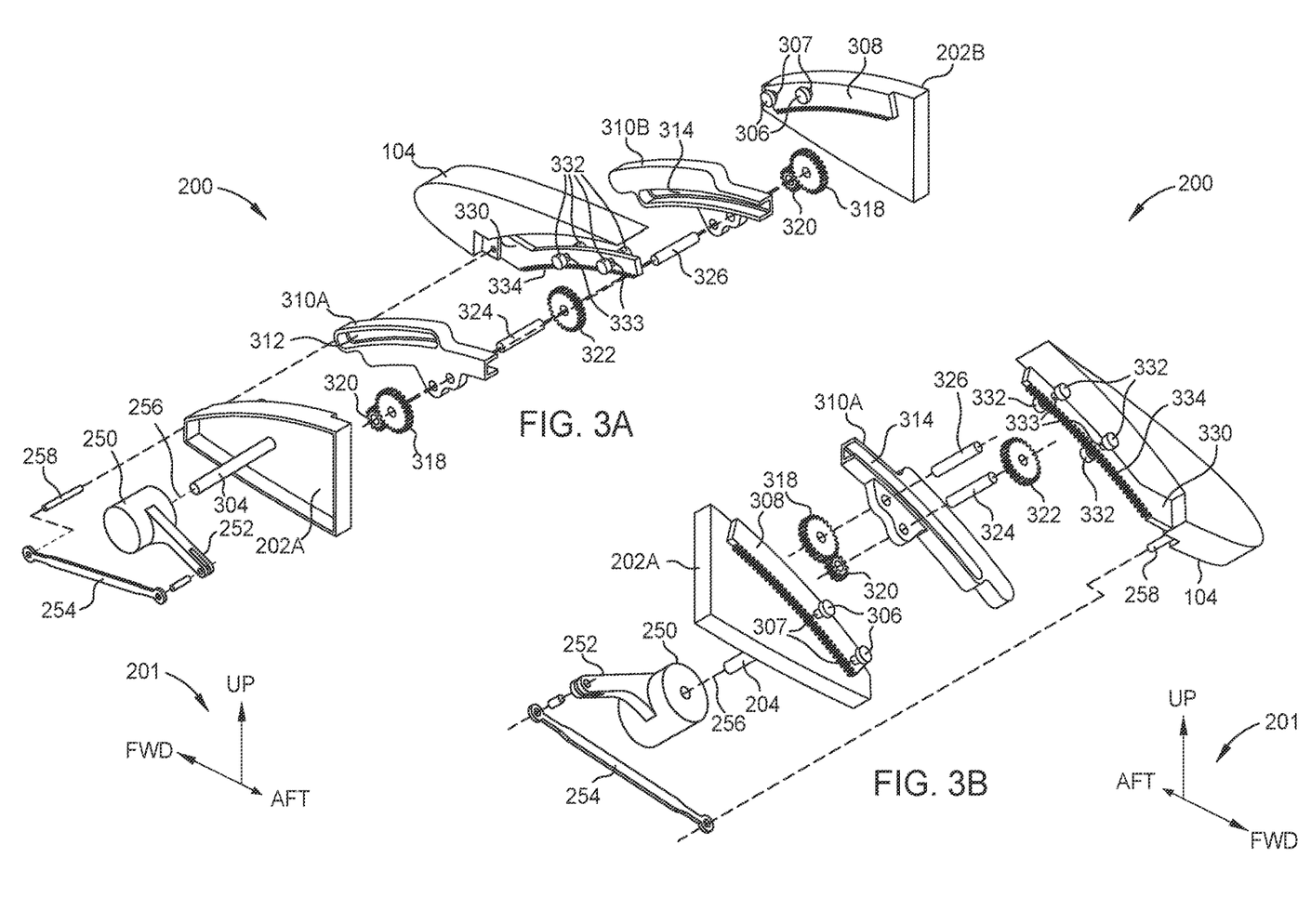
FIGS. 3A and 3B depict exploded isometric views of an aerodynamic surface actuation system, according to another example of the present disclosure.

The actuator 250 further connects to one of a plurality of longitudinal structural elements in an aerodynamic structure. For example, the actuator 250 connects to a rib 202A. The actuator 250 may connect to the rib 202A through a bracket 304 (e.g., a rod) of the rib 202A as depicted in FIG. 3A. The actuator 250 rotates about an actuator axis 256 and is configured to move the slat 104 forward and backward (e.g., aft) as shown in relation to a coordinate system 201. Actuation of the slat 104 is further described in relation to FIGS. 3A-4D.

Although only the rib 202A is shown, the system 200 interfaces with another rib 202B as discussed in relation to FIGS. 3A and 3B. The aerodynamic structure comprises the wing 102 of the aircraft 100 as previously discussed in relation to FIG. 1A, and the longitudinal structural elements comprise a plurality of ribs 202 of the wing 102.

In some embodiments, the longitudinal structural elements includes a stringer or a stiffener and the like. In other embodiments, the actuator may be a different type of actuator, such as a linear actuator as described in relation to FIGS. 5A and 5B.

FIGS. 3A and 3B depict exploded isometric views of the aerodynamic surface actuation system 200, according to another example of the present disclosure. In particular, FIGS. 3A and 3B show two different perspectives of the system 200 in a fully retracted position. FIG. 3B omits certain parts of the system 200 for illustrative purposes.

The system 200 comprises a plurality of outer tracks 310. The plurality of outer tracks 310 includes outer tracks 310A and 310B and provides an actuation system to extend or retract the slat 104. Each outer track 310A and 310B (referred to as outer tracks 310) includes an outer roller channel 312 and an inner roller channel 314, where the outer roller channel 312 is positioned above the inner roller channel 314 (referred to as an over-under configuration) in the depicted embodiment. The outer tracks 310 are used to extend and retract the slat 104. The stacked (over-under in this example) configuration of the channels 312 and 314 allows the channels 312 and 314 to be nested such that they overlap (e.g., the outer roller channel 312 is above the inner roller channel 314) for at least a portion of the outer tracks 310. The nested channels 312 and 314 beneficially allow the system 200 to actuate the slat 104 to a fully extended position with a shorter track (e.g., the outer tracks 310) than the single body tracks 186 of the conventional system 180 discussed in relation to FIG. 1B.

The slat 104 is connected to a carrier, which is shown as a slat rib 330 in the depicted embodiment. The slat rib 330 includes a plurality of rollers 332 (referred to as rollers 332) configured to move within the inner roller channels 314 of the outer tracks 310. The rollers 332 are mounted on posts 333 that protrude from the slat rib 330, although they may be mounted by other means. The rollers 332 are configured to rotate as they move through the inner roller channels 314, which allows the slat 104 to extend and retract smoothly. The slat rib 330 further includes a carrier rack 334, which is used as an interface for actuating the slat 104. For example, a carrier pinion gear 322 is configured to interface with the carrier rack 334 and to ultimately transfer motion from the slat 104 to the outer tracks 310, which extends and retracts with the slat 104. The carrier pinion gear 322 connects to a forward shaft 324 that extends through each outer track 310A and 310B. The shaft further connects to idler gears 320, which are positioned between each outer track 310A and 310B and a respective rib 202A and 202B.

The gears 320 and 322 and the forward shaft 324 rotate in unison when the slat 104 is actuated. Thus, the carrier rack 334 and the carrier pinion gear 322 form a rack and pinion mechanism configured to rotate the forward shaft 324 and the idler gears 320. A fixed rack pinion gear 318 is also disposed between each rib 202A and 202B (referred to as ribs 202) and a respective outer track 310A and 310B. The fixed rack pinion gears 318 connect to an aft shaft 326. The aft shaft is positioned aft of the forward shaft 324 (in relation to the coordinate system 201) and extends through the outer tracks 310. The idler gears 320 are configured to interface with the fixed rack pinion gears 318. For example, the idler gears 320 are configured to operationally engage the fixed rack pinion gears 318 such that rotation of the idler gears 320 causes the fixed rack pinion gears 318 to rotate.

The system 200 further includes a plurality of fixed racks 308 (referred to as fixed racks 308). Each of the fixed racks 308 is mounted to a rib 202A and 202B and may be part of the rib 202A and 202B. The fixed rack pinion gears 318 are configured to interface with the fixed racks 308 of the ribs 202. For example, the fixed rack pinion gears 318 operationally engage the fixed racks 308 to move the outer tracks 310 in a forward or an aft direction. Thus, the fixed racks 308 and the fixed rack pinion gears 318 form a rack and pinion mechanism configured to move the outer tracks 310 when the fixed rack pinion gears 318 rotate. The ribs 202 further include a plurality of fixed rollers 306 (referred to as fixed rollers 306) mounted to the ribs 202, which may include mounting the fixed rollers 306 to the fixed racks 308. The fixed rollers 306 are mounted on posts 307 that protrude from the ribs 202, and as shown, are disposed in the outer roller channels 312 of the outer tracks 310. The fixed rollers 306 are configured to move through the outer roller channels 312 when the outer tracks 310 are actuated. The fixed rollers 306 are further configured to rotate as they move through the outer roller channels 312, which allows the slat 104 to extend and retract smoothly.

Although the fixed rollers 306 are shown as mounted to the fixed racks 308 of the ribs 202, the mounting location may vary in other embodiments. For example, in other embodiments the fixed racks 308 may not be in line with the outer roller channels 312 (such as depicted in FIG. 2). In such embodiments, the fixed rollers 306 may be mounted directly to the ribs 202.

In some embodiments, the carrier rack 334 is a unitary body with the slat rib 330. In some embodiments, the carrier rack 334 is permanently or removably attached to the slat rib 330. This beneficially allows the carrier rack 334 to comprise a different material than the slat rib 330. For example, the carrier rack 334 may comprise a steel that is suited for interfacing with gears and the slat rib 330 may comprise aluminum or an aluminum alloy, which is lighter than steel.

Although the aerodynamic surface of the embodiment described in FIGS. 2-3B is a slat, in other embodiments, the aerodynamic surface may be a flap, such as a trailing edge flap of the wing. In such embodiments, the carrier may be a flap rib.

In some embodiments, the outer tracks 310 comprise a metal, such as a high-strength steel. In some embodiments, the rollers 306 and 332 also comprise high-strength steel. For example, the rollers 306 and 332 may be made of steel or have a steel coating where the rollers 332 and 306 interface with the channels 312 and 314 of the outer tracks 310. Alternatively, the rollers 306 and 332 may comprise other materials (e.g., titanium and the like) and coatings (e.g., chrome, electroless nickel with boron nitride, and hard face coatings such as tungsten-carbide cobalt and the like). In some embodiments, the rollers 306 and 332 comprise additional components to help rotation such as bearings and the like. In some embodiments, the shafts 324 and 326 may further comprise bearings to allow the shafts 324 and 326 to rotate without contacting the outer tracks 310.

In some embodiments, the stacked configuration of the outer tracks 310 may be reversed. For example, the inner roller channel 314 may be positioned above the outer roller channel 312. The slat rib 330; the rollers 306 and 332; the gears 318, 320, and 322; the shafts 324 and 326; and the fixed racks 308 may be configured differently to accommodate the flipped position of the channels 312 and 314. For example, the fixed racks 308 and the fixed rollers 306 may be positioned at different locations on the ribs 202 to allow the fixed rollers 306 to move in the lowered outer roller channels.

The system 200 includes an arrangement of the components configured to interface and move together. Generally, the components coordinate to provide a controllable movement of an aerodynamic surface between a plurality of positions, such as may be commanded by an aircraft control system. In particular, the different racks 308 and 334; gears 318, 320, and 322; and outer tracks 310 provide an actuation system to extend or retract an aerodynamic surface (e.g., the slat 104) between various positions. FIGS. 4A-4D show how the components of the system 200 interface and move as the system 200 is actuated.

Figure 4A:
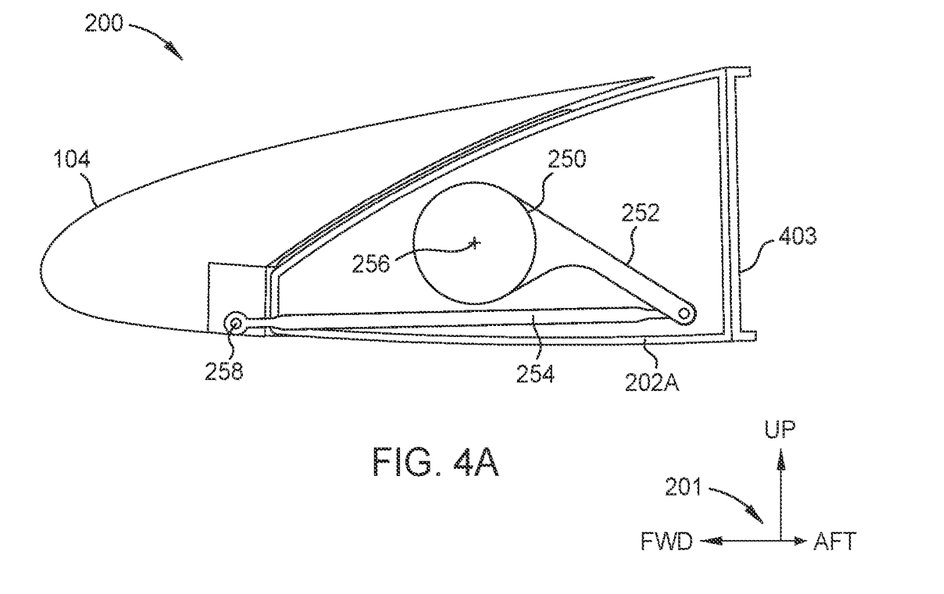
FIGS. 4A and 4B depict side plan views of a different aerodynamic surface actuation system from in a fully retracted and a partially extended position, respectively, according to another example of the present disclosure.
Figure 4B:
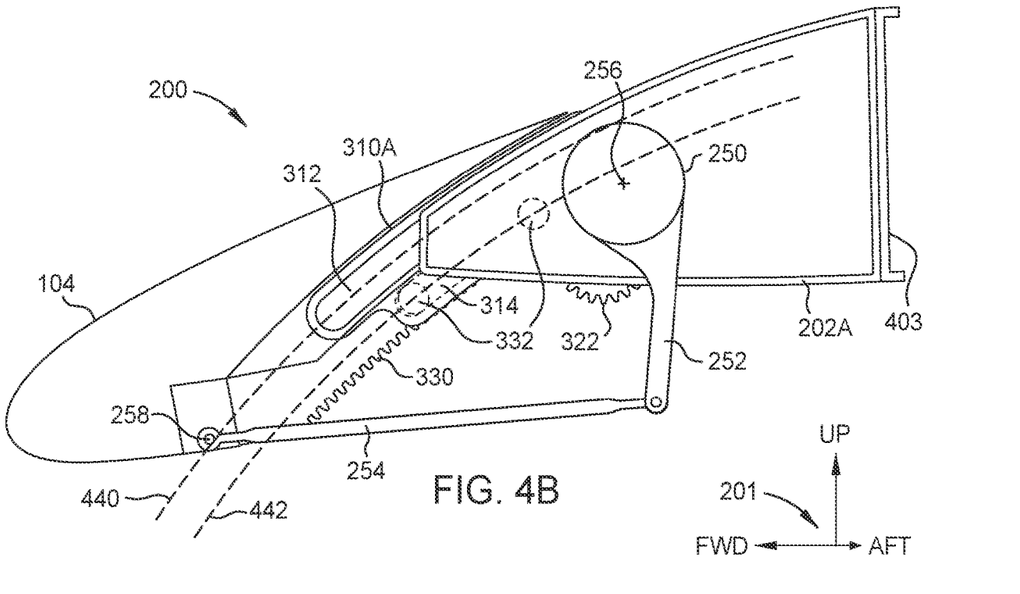

FIGS. 4A and 4B depict side plan views of the system 200 from FIGS. 3A and 3B in a fully retracted (FIG. 4A) and a fully extended (FIG. 4B) position, respectively, according to another example of the present disclosure. In particular, FIGS. 4A and 4B show how the actuator 250 moves the slat 104 and actuates the system 200. Each rib 202A and 202B (not shown) attaches to a spar 403, which is a transverse structure element disposed inside a wing 102 (as discussed in relation to FIG. 1A).

As shown in FIG. 4A, the actuator arm 252 of the actuator 250 faces an aft direction (in relation to the coordinate system 201) at the fully retracted position. When the slat 104 is extended, as shown in FIG. 4B, the actuator 250 and actuator arm 252 rotate in a clockwise direction (as shown on paper) and the actuator arm 252 pushes the control element 254 in a forward direction. The control element 254 in turn pushes on the bracket 258 of the slat 104 and moves the slat 104 in the forward direction. The inner roller channel 314 and the rollers 332 are shown as dashed in FIG. 4B because they are hidden from view.

The slat rib 330 moves with the slat 104 and actuates the rest of the system 200. For example, the slat rib 330 moves the outer tracks 310 in the forward direction by interfacing with additional components as described in relation to FIGS. 4C and 4D. Thus, the actuator 250 provides a controllable movement of an aerodynamic surface between a plurality of set positions. The plurality of set positions comprises a fully extended position, a fully retracted position, and positions in between the fully extended and fully retracted positions including the partially extended position shown in FIGS. 4A and 4B.

Figure 4C:
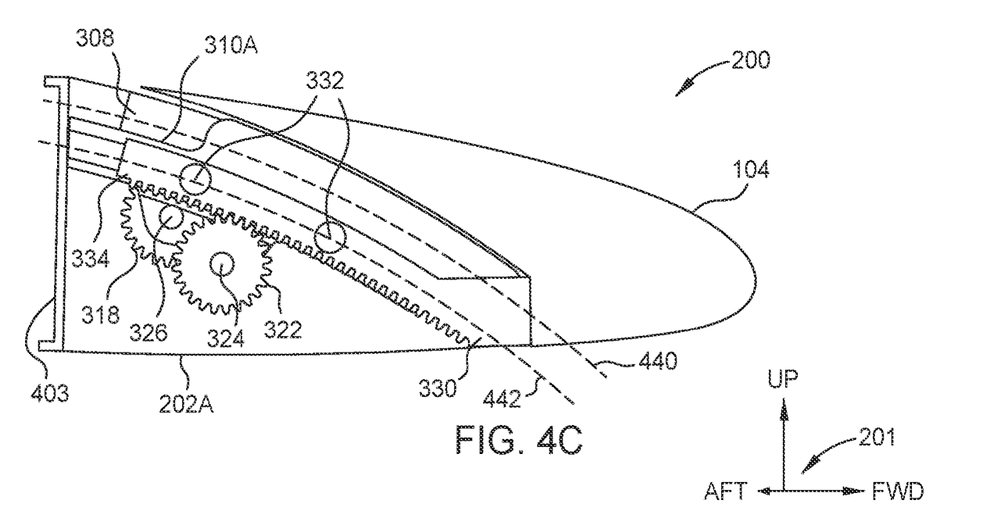
FIGS. 4C and 4D depict side plan views of the aerodynamic surface actuation system from FIGS. 4A and 4B in a fully retracted and a partially extended position, respectively, according to another example of the present disclosure.
Figure 4D:
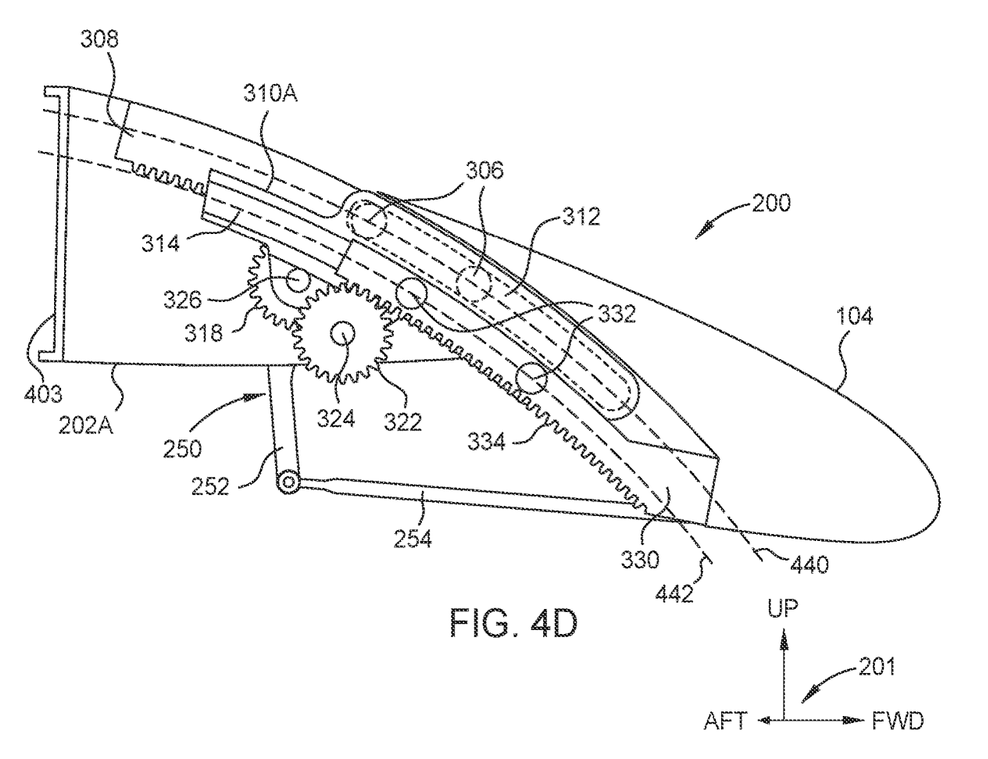

FIGS. 4C and 4D depict different side plan views of the system 200 from FIGS. 4A and 4B in a fully retracted and a fully extended position, respectively, according to another example of the present disclosure. In particular, FIGS. 4C and 4D shows side plan views from an opposing side of FIGS. 4A and 4B as the slat 104 moves in the forward direction and the system 200 is actuated. Certain parts of the system 200 are omitted for illustrative purposes and the idler gear 320 (as discussed in relation to FIGS. 3A and 3B) is hidden from view behind the carrier pinion gear 322.

As the system 200 is actuated, the outer tracks 310 extend and retract the slat 104. The channels 312 and 314 of the outer tracks 310 actuate the system 200 through the slat rib 330 and the fixed rack pinion gear 318. As the slat rib 330 moves, the rollers 332 of the slat rib 330 interface with the inner roller channel 314 of the outer track 310A. For example, as the actuator 250 moves the slat 104 and the slat rib 330 in the forward direction, the rollers 332 move forward in the inner roller channel 314. The carrier rack 334 also moves with the slat rib 330 and further rotates the carrier pinion gear 322. The forward shaft 324 and the idler gear 320 rotate with the carrier pinion gear 322 and the idler gear 320 operationally engages and turns the fixed rack pinion gear 318. The fixed rack pinion gear 318 operationally engages the fixed rack 308 of the rib 202A and moves the outer track 310A in the forward direction. The outer roller channel 312 of the outer track 310A moves around the fixed rollers 306 of the rib 202A. The fixed rollers 306 guide the outer track 310A as it moves. The outer roller channel 312 and the fixed rollers 306 are shown as dashed in FIG. 4D because they are hidden from view.

The outer roller channel 312 and the inner roller channel 314 of the outer track 310A each generally define a curvilinear path 440 and 442, respectively. The extension of the outer track 310A effectively extends a length of the inner roller channel 314 as the inner roller channel 314 moves with the outer track 310A along the curvilinear path 442. This beneficially allows the slat 104 to be extended a distance in the forward direction that is longer than the length of the inner roller channel 314.

Although the description of how the system 200 is actuated, as described in relation to FIGS. 4C and 4D, is regarding the outer track 310A and the rib 202A, the same description applies to the outer track 310B and the rib 202B. For example, the rotation of the carrier pinion gear 322 and the forward shaft 324 turns an idler gear 320 and a fixed rack pinion gear 318, which operationally engages the fixed rack 308 of the rib 202B. The rollers 332 of the slat rib 330 move through the inner roller channel 314 of the outer track 310B and the outer roller channel 312 of the outer track 310B moves around the fixed rollers 306 of the rib 202B. The outer tracks 310A and 310B work together and beneficially increase the stability of the system 200 as the system is actuated. The two tracks further ensure the system 200, and in particular the gearing, is evenly loaded.

The stacked configuration of the channels 312 and 314 of the outer tracks 310 beneficially allows for a thinner outer track 310 than tracks having channels with a side-by-side configuration. For example, when the slat 104 is extended, air may flow under the slat 104, up in relation to the coordinate system 201, between and around the outer tracks 310, and over the wing 102 (as discussed in relation to FIG. 1A) in an aft direction. The stacked configuration of the outer tracks 310 has a smaller cross-section to the airflow, which beneficially allows more air to flow through openings between the ribs 202 and the slats 104 than a side-by-side configuration. The air flows through the openings from an underside of the wing 102, which is at a higher pressure than air at a top of the wing 102, and adds energy to the air flowing over the top of the wing 102. The increased energy allows air flowing over the top of the wing 102 to stay attached to the wing 102 for a longer distance along a length of the wing 102 at a higher angle of attack, which beneficially increases the lift of the wing 102.

As shown in FIGS. 4A and 4C, when the aerodynamic surface actuation system 200 is in the fully retracted position, no part of the aerodynamic surface actuation system 200 extends beyond the wing spar 403. Thus, the aerodynamic surface actuation system 200 fits entirely within a volume created by the ribs 202, the wing spar 403, and the slats 104. This beneficially avoids the need for penetrations in the wing spar 204.

FIGS. 4A-4D show one specific embodiment of the system 200 with particular geometries, angles, and linkages. Other embodiments may include variants of the previously disclosed components (e.g., the outer tracks 310, the slat rib 330, the ribs 202, and the slat 104) where at least one of the disclosed components may have a different geometry than what is shown in FIGS. 4A-4D. For example, the dimensionality, length, shape, and the like of the components of the system 200 may vary in other embodiments. The components may vary to conform to a surrounding wing, which may differ than the wing 102 shown in FIG. 1A, such as conforming to the space available inside a leading edge of the surrounding wing. In some embodiments, the system 200 may extend the slat 104 further in the forward direction than shown in FIGS. 4B and 4D. In some embodiments, the slat rib 330 and the carrier rack 334 have a longer length such that they extend further in the aft direction. The longer length of the slat rib 330 allows the slat 104 to extend further forward and allows the carrier rack 334 to operationally engage the carrier pinion gear 322 while in the system 200 is in the fully extended position. In some embodiments, the outer roller channel 312 of each of the outer tracks 310 and the surrounding portion of the outer tracks 310 may extend further in the aft direction to allow the outer tracks 310 to travel further along the fixed rollers 306 when the slat 104 is extended.

Some embodiments further include a position sensor such as an encoder or angular sensor to sense a position or angle of the outer tracks 310 or of the aerodynamic surface. The position sensor may be part of the actuator 250 or mounted to the actuator arm 252. In some embodiments, the position sensor may interface with a system controller to control the actuator 250 or actuator arm 252, such as described in relation to FIG. 7. For example, the system controller may control the position or rotation of the actuator 250 or actuator arm 252 using data from the position sensor.

Figure 5A:
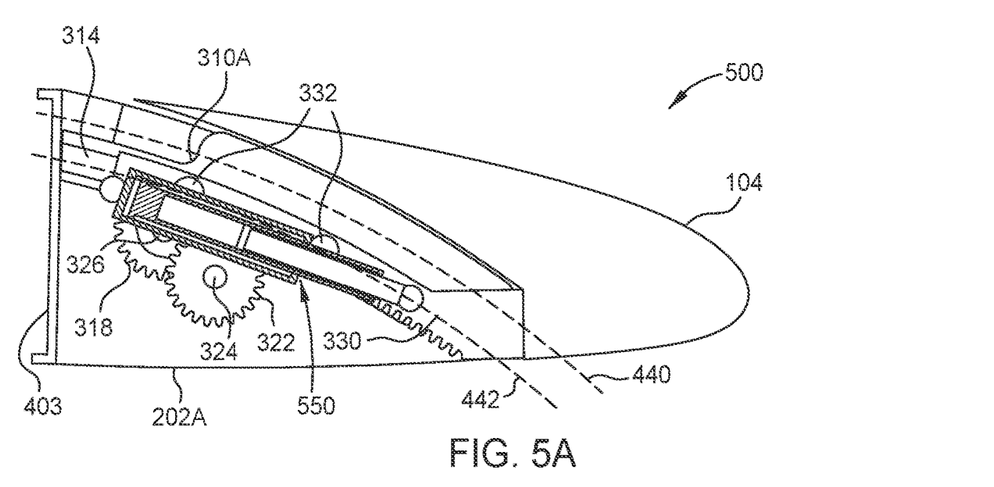
FIGS. 5A and 5B depict side plan views of an aerodynamic surface actuation system in a fully retracted and a fully extended position, respectively, according to another example of the present disclosure.
Figure 5B:
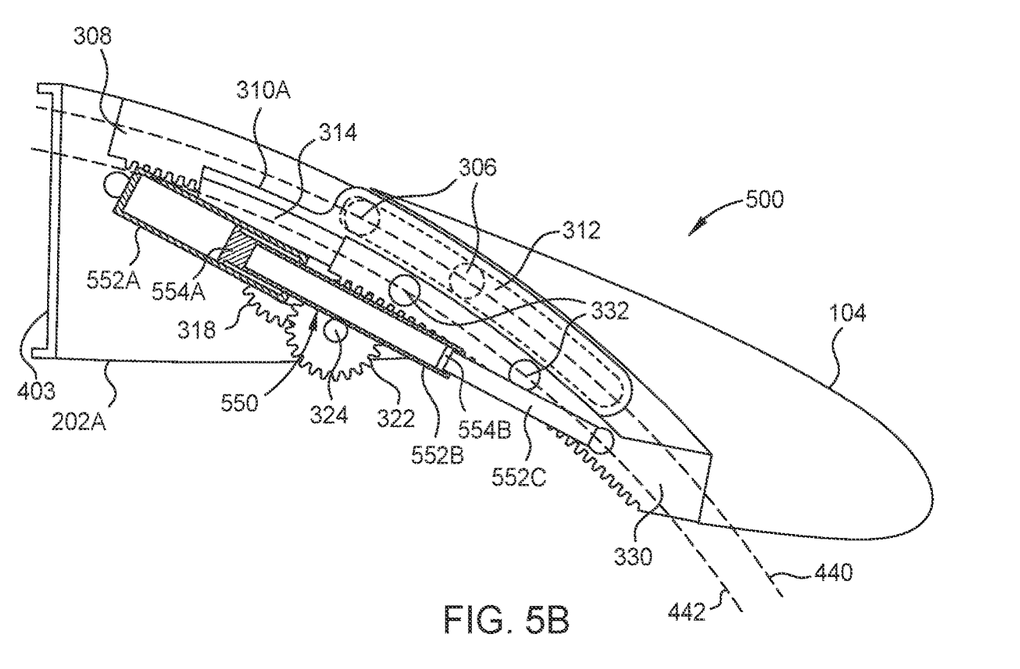

FIGS. 5A and 5B depict side plan views of an aerodynamic surface actuation system 500 in a fully retracted and a fully extended position, respectively, according to another example of the present disclosure. In particular, FIGS. 5A and 5B show how the aerodynamic surface actuation system 500 (referred to as the system 500) moves as the slat 104 is extended by a linear actuator 550. The system 500 is similar to the system 200, except the linear actuator 550 replaces the actuator 250, the control element 254, and the bracket 258 and interfaces with the slat 104 in a different manner.

As shown, the linear actuator 550 comprises three segments a first segment 552A, a second segment 552B, and a third segment 552C. The second segment 552B includes a flange 554A that moves along an inner diameter of the first segment 552A when the linear actuator 550 moves. Similarly, the third segment 552C includes a flange 554B that moves along an inner diameter of the second segment 552B. The linear actuator 550 attaches to the rib 202B (not shown) at one end and to the slat rib 330 of the slat 104 at another end. The linear actuator 550 is configured to actuate the system 500 by pushing the slat 104 in a forward direction along the curvilinear paths 440 and 442 as dictated by the channels of the outer track 310A (e.g., the channels 312 and 314 in FIGS. 4A and 4B). The slat rib 330 of the slat 104 operationally engages the outer track 310A similar to as discussed in relation to FIGS. 4A and 4B. The outer roller channel 312 and the fixed rollers 306 are shown as dashed in FIG. 5B because they are hidden from view.

The system 500 may include further differences from the system 200. As shown, the linear actuator 550 beneficially reduces the components required in the system 500 when compared to the system 200. For example, the system 500 does not include an outer track 310B, a fixed rack 308 of the rib 202B, gears 318 and 320 disposed between the outer track 310B and the rib 202; and the bracket 304 of the rib 202A. In other embodiments, the system 500 includes the outer track 310B, a fixed rack 308 of the rib 202B, gears 318 and 320 disposed between the outer track 310B and the rib 202B; and the bracket 304 of the rib 202A.

FIGS. 5A and 5B show one specific embodiment of the system 500 with particular geometries, angles, and linkages. Other embodiments may include variants of the previously disclosed components (e.g., the outer track 310A, the slat rib 330, the ribs 202, and the slat 104) where at least one of the disclosed components may have a different geometry than what is shown in FIGS. 5A and 5B. For example, the dimensionality, length, shape, and the like of the components of the system 500 may vary as described in relation to FIGS. 4A-4D.

In some embodiments, the linear actuator 550 may attach to different components and locations. For example, the linear actuator 550 attaches to the rib 202A, both ribs 202, or the spar 403 at the one end or to the slat rib 330 at the another end. In some embodiments, the linear actuator is a drop in replacement for the actuator 250 discussed in FIGS. 4A and 4B.

Examples of Methods for Positioning an Aerodynamic Surface

Figure 6:
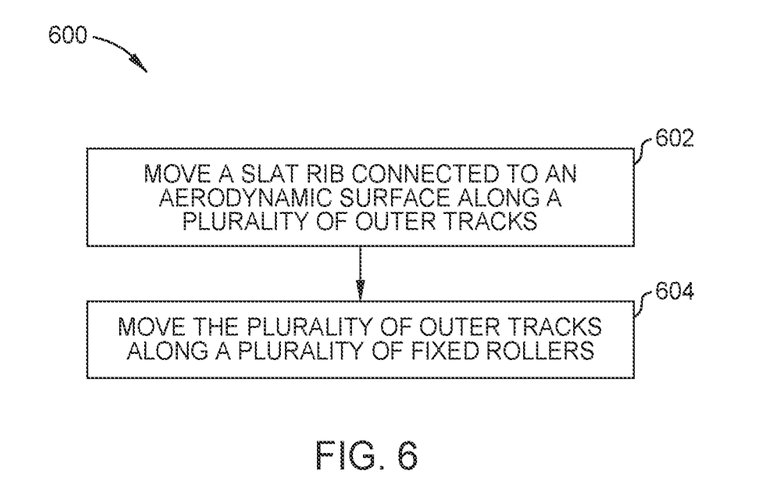
FIG. 6 depicts an example method of controlling a position of an aerodynamic surface using an aerodynamic surface actuation system.

FIG. 6 depicts an example method of controlling the position of an aerodynamic surface using an aerodynamic surface actuation system, according to another example of the present disclosure.

Method 600 begins at step 602 with moving a carrier connected to an aerodynamic surface along a plurality of outer tracks, wherein a plurality of rollers connected to the carrier interface with inner roller channels of the plurality of outer tracks, as described above with respect to FIGS. 2-5B.

Method 600 then proceeds to step 604 with moving the plurality of outer tracks along a plurality of fixed rollers, wherein outer roller channels of the plurality of outer tracks interface with the plurality of fixed rollers, as described above with respect to FIGS. 2-5B.

Some embodiments of method 600 further include moving an actuator to control a position of the slat rib and a position of the plurality of outer tracks via a control element, as described above with respect to FIGS. 2-5B. In some embodiments, the actuator is configured to move the slat rib and the plurality of outer tracks along a curvilinear path between a plurality of set positions, such as described above with respect to FIGS. 4A-5B. For example, the plurality of set positions comprises a fully extended position, a fully retracted position, and positions in between the fully extended and fully retracted positions.

Some embodiments further include sensing a position of the slat rib track, the plurality of outer tracks, or the aerodynamic surface using a position sensor; and controlling the actuator using a system controller, such as described above with respect to FIGS. 4A-4D. In some embodiments, the position sensor is an encoder or angular sensor.

In some embodiments of method 600, the aerodynamic surface is a slat of an aircraft wing, as described above with respect to FIGS. 1A and 3A-5B.

In some embodiments of method 600, the aerodynamic surface is a flap of an aircraft wing, as described above with respect to FIGS. 1A and 2.

Note that FIG. 6 is just one example of a method, and other methods including fewer, additional, or alternative steps are possible consistent with this disclosure.

Example Processing System

Figure 7:
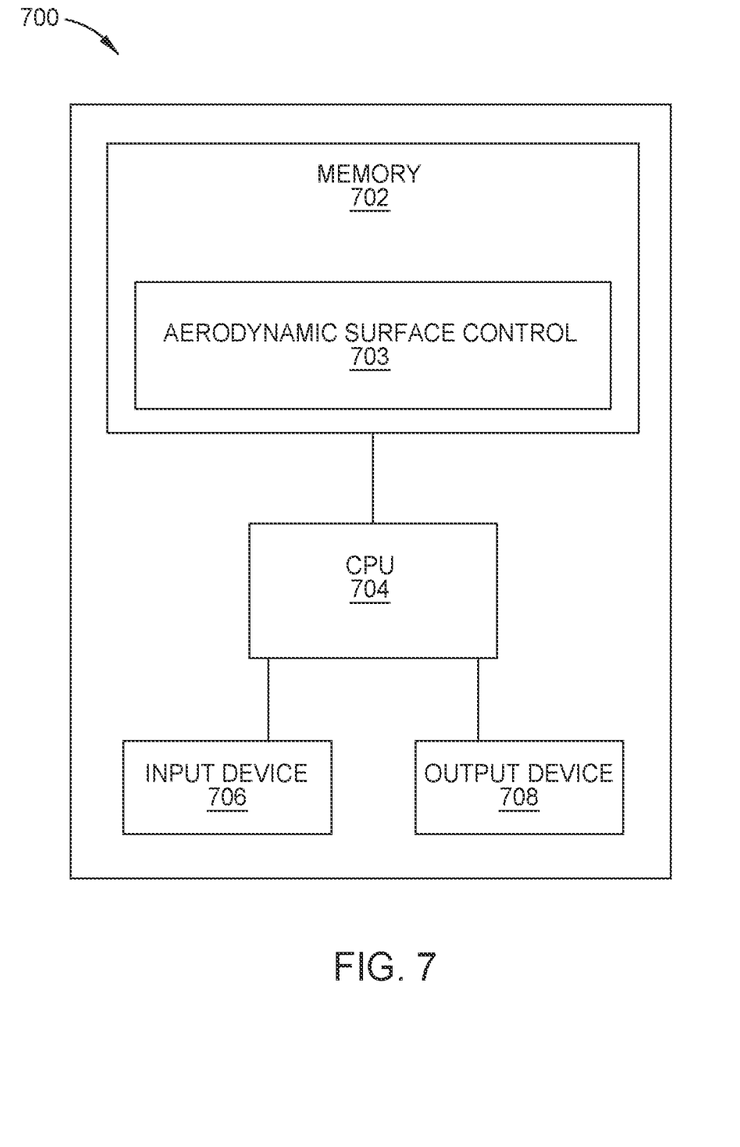
FIG. 7 depicts a schematic view of an example system controller that can be used according to the systems and methods described herein.

FIG. 7 depicts a schematic view of an example system controller 700 that can be used according to the systems and methods described herein. The system controller 700 includes a processor 704 (e.g., a central processing unit (CPU)) in data communication with a memory 702, an input device 706, and an output device 708. Although described separately, it is to be appreciated that functional blocks described with respect to the system controller 700 need not be separate structural elements. For example, the processor 704 and memory 702 is embodied in a single chip. The processor 704 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 704 can be coupled, via one or more buses, to read information from or write information to memory 702. The processor may additionally, or in the alternative, contain memory, such as processor registers. The memory 702 can include processor cache, including a multi-level hierarchical cache in which different levels have different capacities and access speeds. The memory 702 can also include random access memory (RAM), other volatile storage devices, or non-volatile storage devices. The storage can include hard drives, flash memory, etc. Memory 702 can also include a computer program product embodied on memory 702 comprising code such as an aerodynamic surface control application 703, which is used to control the actuator as described in FIGS. 2-5B. Aerodynamic surface control application 703 may be code that can be executed by processor 704. In various instances, the memory is referred to as a computer-readable storage medium or a non-transitory computer-readable medium. The computer-readable storage medium is a non-transitory device capable of storing information, and is distinguishable from computer-readable transmission media such as electronic transitory signals capable of carrying information from one location to another. The non-transitory computer readable medium includes computer-executable instructions that, when executed by a processing system, cause the processing system to perform a method, as described in relation to FIGS. 2-5B, including moving a slat rib connected to an aerodynamic surface along a plurality of outer tracks, wherein a plurality of rollers connected to the slat rib interface with inner roller channels of the plurality of outer tracks; and moving the plurality of outer tracks along a plurality of fixed rollers, wherein outer roller channels of the plurality of outer tracks interface with the plurality of fixed rollers. In some embodiments, the method performed by the processing system includes moving an actuator to control a position of the slat rib and a position of the plurality of outer tracks via a control element. Computer-readable medium as described herein may generally refer to a computer-readable storage medium or computer-readable transmission medium.

The processor 704 also may be coupled to an input device 706 and an output device 708 for, respectively, receiving input from and providing output to the system controller 700. Suitable input devices include, but are not limited to a video camera (possibly coupled with video processing software to, e.g., detect a position of the middle track, the plurality of outer tracks, or the aerodynamic surface), an encoder (e.g., an optical or magnetic, capacitive, or inductive encoder), a resolver, a potentiometer, an angle sensor, an accelerometer, a gyroscope, an inertial measurement unit, or a motion detector. The input device 706 includes a position sensor such as an encoder or angle position sensor as discussed in relation to FIGS. 4A-4D. Suitable output devices include, but are not limited to, the actuator as discussed in relation to FIGS. 2-5B.

Aspects of the present disclosure have been described above with reference to specific embodiments. Persons skilled in the art, however, will understand that various modifications and changes may be made thereto without departing from the broader spirit and scope of the present disclosure as set forth in the appended claims. The foregoing description and drawings are, accordingly, to be regarded in an illustrative rather than a restrictive sense.

EXAMPLE CLAUSES

Implementation examples are described in the following numbered clauses:

Clause 1. An aerodynamic surface actuation system, comprising a plurality of outer tracks, wherein each outer track of the plurality of outer tracks comprises an inner roller channel; and an outer roller channel positioned above the inner roller channel; an aerodynamic surface connected to a carrier, wherein the carrier comprises a plurality of rollers configured to move within inner roller channels of the plurality of outer tracks; and a carrier rack; a plurality of fixed rollers mounted to a plurality of longitudinal structural elements in an aerodynamic structure, wherein the plurality of fixed rollers are disposed within outer roller channels of the plurality of outer tracks; and a plurality of fixed racks, wherein each fixed rack of the plurality of fixed racks is mounted to a longitudinal structural element of the plurality of longitudinal structural elements.

Clause 2. The aerodynamic surface actuation system of Clause 1, further comprising a carrier pinion gear configured to interface with the carrier rack; and a plurality of idler gears connected to the carrier pinion gear via a forward shaft and configured to interface with a plurality of fixed rack pinion gears, wherein each idler gear of the plurality of idler gears is configured to interface with a respective fixed rack pinion gear, and wherein each fixed rack pinion gear of the plurality of fixed rack pinion gears is configured to interface with a fixed rack of the plurality of fixed racks.

Clause 3. The aerodynamic surface actuation system of any one of Clauses 1-2, further comprising an actuator configured to move the aerodynamic surface forward and backward.

Clause 4. The aerodynamic surface actuation system of Clause 3, wherein the actuator comprises a rotary actuator, and the aerodynamic surface actuation system further comprises a control element connected between the actuator and the aerodynamic surface.

Clause 5. The aerodynamic surface actuation system of Clause 3, wherein the actuator comprises a linear actuator.

Clause 6. The aerodynamic surface actuation system of any one of Clauses 1-5, wherein the aerodynamic structure is an aircraft wing.

Clause 7. The aerodynamic surface actuation system of Clause 6, wherein the aerodynamic surface comprises one of a slat or a flap of an aircraft wing.

Clause 8. The aerodynamic surface actuation system of Clause 7, wherein the aerodynamic surface is a slat of an aircraft wing and the carrier comprises a slat rib.

Clause 9. The aerodynamic surface actuation system of Clause 7, wherein the aerodynamic surface is a flap of an aircraft wing and the carrier comprises a flap rib.

Clause 10. The aerodynamic surface actuation system of Clause 6, wherein the plurality of longitudinal structural elements comprise ribs of the aircraft wing.

Clause 11. The aerodynamic surface actuation system of Clause 6, wherein when in a fully retracted position, no part of the aerodynamic surface actuation system extends beyond a spar of the aircraft wing.

Clause 12. The aerodynamic surface actuation system of any one of Clauses 1-11, wherein the inner roller channel and outer roller channel of each outer track of the plurality of outer tracks generally define curvilinear paths.

Clause 13. A method of actuating an aerodynamic surface, comprising moving a carrier connected to an aerodynamic surface along a plurality of outer tracks, wherein a plurality of rollers connected to the carrier interface with inner roller channels of the plurality of outer tracks; and moving the plurality of outer tracks along a plurality of fixed rollers, wherein outer roller channels of the plurality of outer tracks interface with the plurality of fixed rollers.

Clause 14. The method of Clause 13, further comprising moving an actuator to control a position of the slat rib and a position of the plurality of outer tracks via a control element.

Clause 15. The method of Clause 14, wherein the actuator is configured to move the slat rib and the plurality of outer tracks along a curvilinear path between a plurality of set positions.

Clause 16. The method of Clause 15, wherein the plurality of set positions comprises a fully extended position, a fully retracted position, and positions in between the fully extended and fully retracted positions.

Clause 17. The method of Clause 14, further comprising sensing a position of the slat rib, the plurality of outer tracks, or the aerodynamic surface using a position sensor; and controlling the actuator using a processing system.

Clause 18. The method of Clause 17, wherein the position sensor is an encoder or angular sensor.

Clause 19. The method of any one of Clauses 13-18, wherein the aerodynamic surface is a slat or a flap of an aircraft wing.

Clause 20. The method of Clause 19, wherein the aerodynamic surface is a slat of an aircraft wing and the carrier comprises a slat rib.

Clause 21. The method of Clause 19, wherein the aerodynamic surface is a flap of an aircraft wing and the carrier comprises a flap rib.

Clause 22. A processing system, comprising a memory comprising computer-executable instructions; and one or more processors configured to execute the computer-executable instructions and cause the processing system to perform a method in accordance with any one of Clauses 13-21.

Clause 23. A processing system, comprising means for performing a method in accordance with any one of Clauses 13-21.

Clause 24. A non-transitory computer-readable medium comprising computer-executable instructions that, when executed by one or more processors of a processing system, cause the processing system to perform a method in accordance with any one of Clauses 13-21.

Clause 25. A computer program product embodied on a computer-readable storage medium comprising code for performing a method in accordance with any one of Clauses 13-21.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An aerodynamic surface actuation system, comprising:
   a plurality of outer tracks, wherein each outer track of the plurality of outer tracks comprises:
      an inner roller channel; and
      an outer roller channel positioned above the inner roller channel;
   an aerodynamic surface connected to a carrier, wherein the carrier comprises:
      a plurality of rollers configured to move within inner roller channels of the plurality of outer tracks; and
      a carrier rack;
   a plurality of fixed rollers mounted to a plurality of longitudinal structural elements in an aerodynamic structure, wherein the plurality of fixed rollers are disposed within outer roller channels of the plurality of outer tracks; and
   a plurality of fixed racks, wherein each fixed rack of the plurality of fixed racks is mounted to a longitudinal structural element of the plurality of longitudinal structural elements.

2. The aerodynamic surface actuation system of claim 1, further comprising:
   a carrier pinion gear configured to interface with the carrier rack; and
   a plurality of idler gears connected to the carrier pinion gear via a forward shaft and configured to interface with a plurality of fixed rack pinion gears, wherein each idler gear of the plurality of idler gears is configured to interface with a respective fixed rack pinion gear, and wherein each fixed rack pinion gear of the plurality of fixed rack pinion gears is configured to interface with a fixed rack of the plurality of fixed racks.

3. The aerodynamic surface actuation system of claim 1, further comprising an actuator configured to move the aerodynamic surface forward and backward.

4. The aerodynamic surface actuation system of claim 3, wherein:
   the actuator comprises a rotary actuator, and
   the aerodynamic surface actuation system further comprises a control element connected between the actuator and the aerodynamic surface.

5. The aerodynamic surface actuation system of claim 3, wherein the actuator comprises a linear actuator.

6. The aerodynamic surface actuation system of claim 1, wherein the aerodynamic structure is an aircraft wing and the plurality of longitudinal structural elements comprise ribs of the aircraft wing.

7. The aerodynamic surface actuation system of claim 6, wherein the aerodynamic surface comprises one of a slat or a flap of the aircraft wing.

8. The aerodynamic surface actuation system of claim 7, wherein the aerodynamic surface is a slat of the aircraft wing and the carrier comprises a slat rib.

9. The aerodynamic surface actuation system of claim 7, wherein the aerodynamic surface is a flap of the aircraft wing and the carrier comprises a flap rib.

10. The aerodynamic surface actuation system of claim 6, wherein when in a fully retracted position, no part of the aerodynamic surface actuation system extends beyond a spar of the aircraft wing.

11. The aerodynamic surface actuation system of claim 1, wherein the inner roller channel and outer roller channel of each outer track of the plurality of outer tracks generally define curvilinear paths.

12. A method of actuating an aerodynamic surface, comprising:
    moving a carrier connected to an aerodynamic surface along a plurality of outer tracks, wherein a plurality of rollers connected to the carrier interface with inner roller channels of the plurality of outer tracks; and
    moving the plurality of outer tracks along a plurality of fixed rollers, wherein outer roller channels of the plurality of outer tracks interface with the plurality of fixed rollers.

13. The method of claim 12, further comprising moving an actuator to control a position of the carrier and a position of the plurality of outer tracks via a control element.

14. The method of claim 13, wherein the actuator is configured to move the carrier and the plurality of outer tracks along a curvilinear path between a plurality of set positions.

15. The method of claim 14, wherein the plurality of set positions comprises a fully extended position, a fully retracted position, and positions in between the fully extended and fully retracted positions.

16. The method of claim 13, further comprising:
    sensing a position of the carrier, the plurality of outer tracks, or the aerodynamic surface using a position sensor; and
    controlling the actuator using a processing system.

17. The method of claim 16, wherein the position sensor is an encoder or angular sensor.

18. The method of claim 12, wherein the aerodynamic surface comprises one of a slat or a flap of an aircraft wing.

19. The method of claim 18, wherein the aerodynamic surface is a slat of an aircraft wing and the carrier comprises a slat rib.

20. The method of claim 18, wherein the aerodynamic surface is a flap of an aircraft wing and the carrier comprises a flap rib.

* * * * *